March 12, 1957 — E. J. ONDECK — 2,784,976
SELF-LOCKING BALL BEARING HAND CHUCK
Filed June 10, 1954 — 3 Sheets-Sheet 1
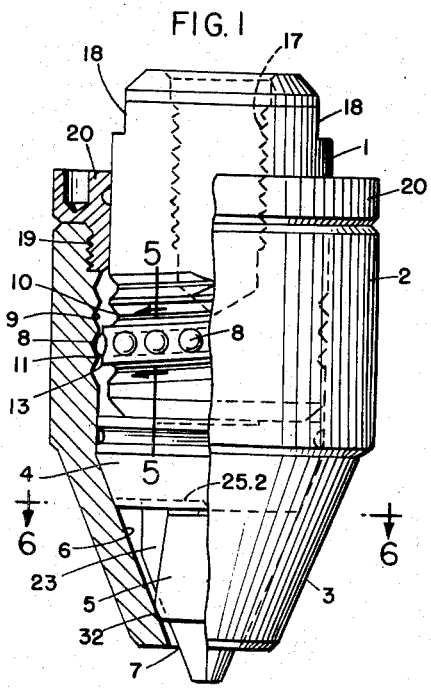
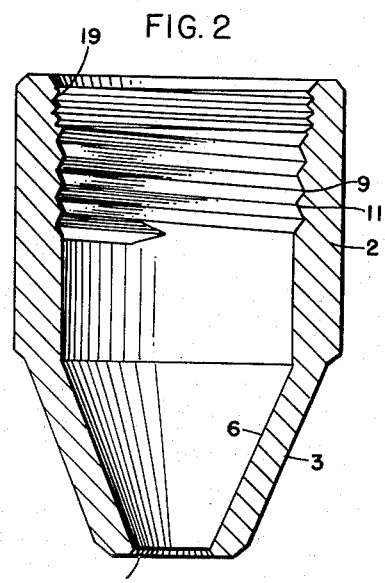
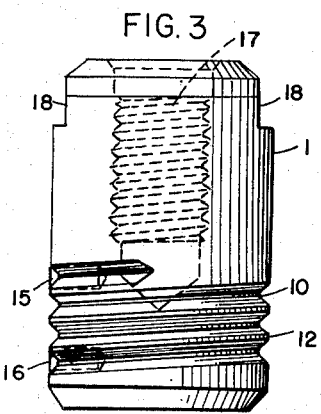
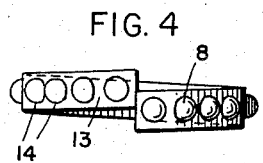
INVENTOR:
ELMER J. ONDECK
BY
ATT'Y March 12, 1957
E. J. ONDECK
2,784,976
SELF-LOCKING BALL BEARING HAND CHUCK
Filed June 10, 1954
3 Sheets-Sheet 2
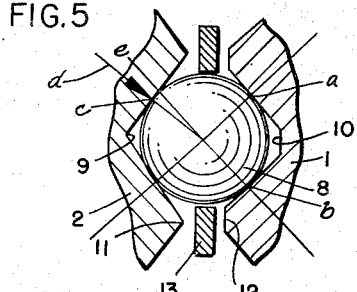
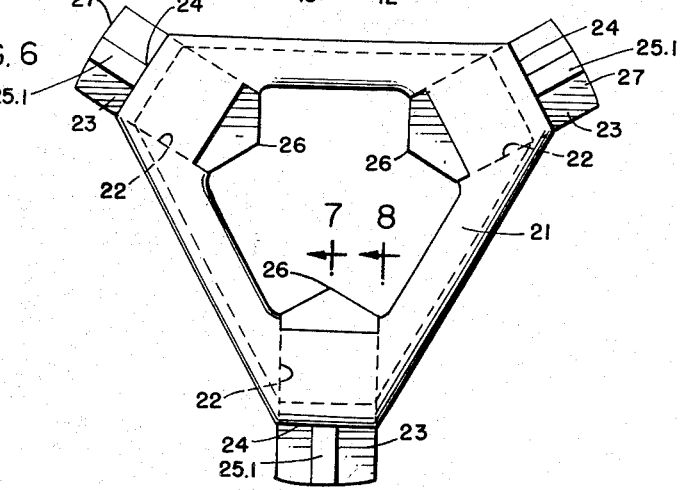
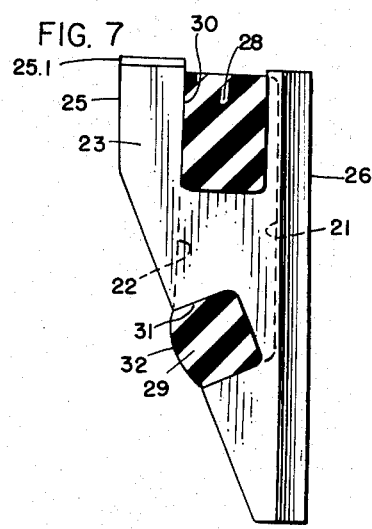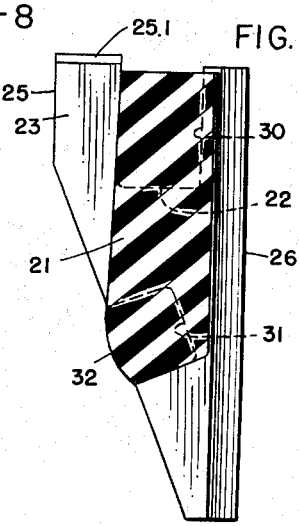
INVENTOR:
ELMER J. ONDECK
BY
ATT'Y

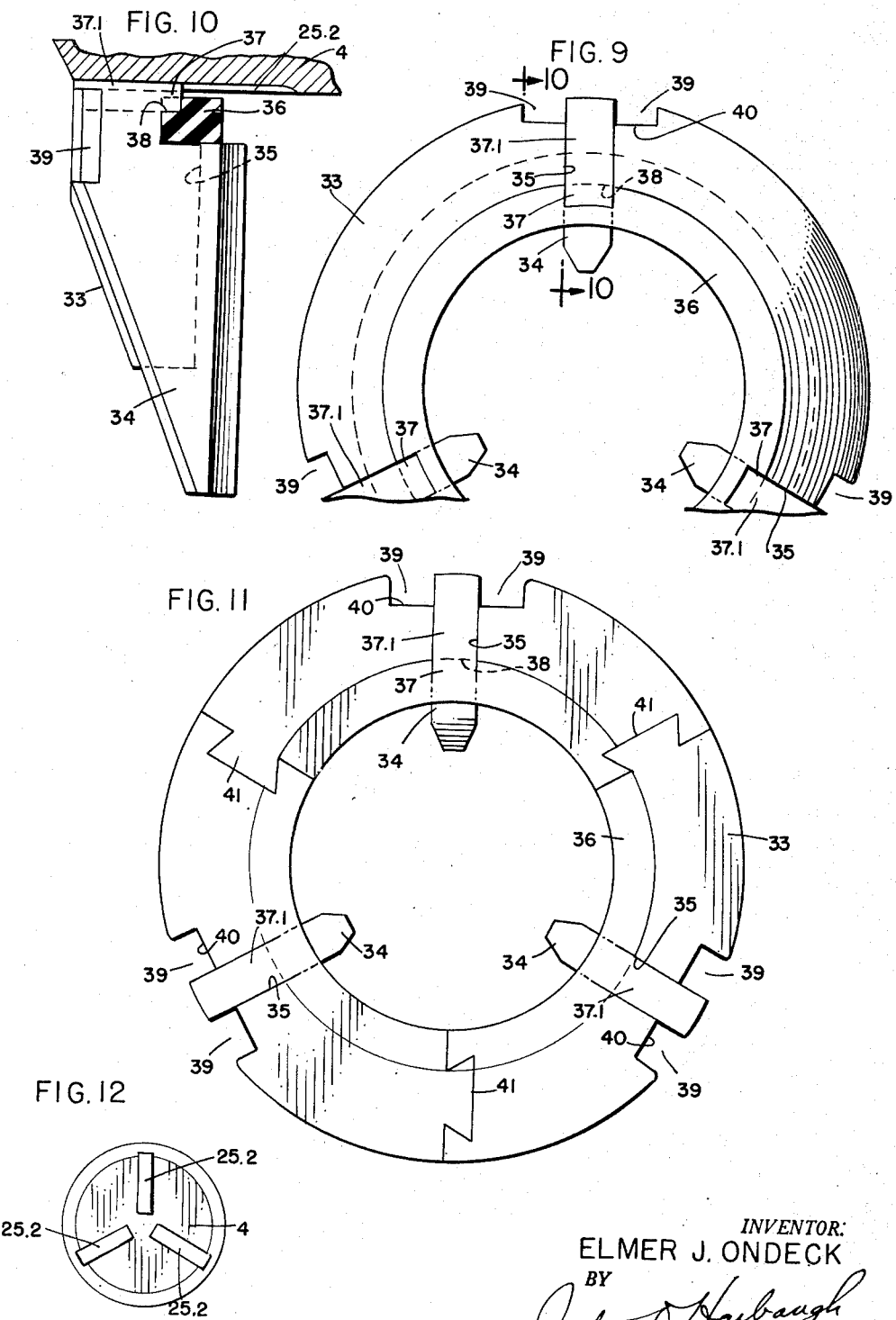

United States Patent Office 2,784,976
Patented Mar. 12, 1957

2,784,976

SELF-LOCKING BALL BEARING HAND CHUCK

Elmer J. Ondeck, Brookfield, Ill., assignor, by mesne assignments, to Supreme Products Corporation, Chicago, Ill., a corporation of Illinois Application June 10, 1954, Serial No. 435,789

19 Claims. (Cl. 279—48)

This invention relates to hand chucks for holding rotatable tools having straight shanks and particularly to improvements in the construction of the drive means for operating the jaws of such chucks, and in the form and arrangement of resilient retaining means for holding the chuck jaws in a unitary self-opening assembly.

The main objects of this invention are to provide an improved construction for ball-bearing hand chucks; to provide an improved hand chuck that is fast operating and which requires less manual effort for either clamping or releasing manipulation; to provide such a device which requires less overall length for maximum axial travel of the collet operating sleeve; to provide such a device that is self-locking at any position when exerting a clamping pressure; to provide a ball bearing hand chuck that is self-aligning for perfect axial alignment of the clasped tool and the chuck body; to provide a ball bearing hand chuck that is of simple construction; and to provide such a device that may be manufactured and assembled at relatively low cost.

Further objects of this invention are to provide a hand chuck having an improved self-operating tool clamping collet; to provide such a device wherein the collet and the chuck sleeve coact to produce a resilient gripping relation between the collet and the tool shank during initial set-up and a positive self-centering clamping action when the sleeve is finally tightened preferably with the jaws supported against relative rotation about their axis when being loaded or when carrying a load; to provide an improved self-releasing collet assembly; to provide such a device wherein individual clamping jaws may be readily removed and replaced; to provide such a device having a unitary, preformed, resilient retainer for a plurality of individual clamping jaw elements; and to provide such a device wherein the removable jaws are physically interlocked with the retainer to form a self-contained unit.

A specific embodiment of this invention is shown in the accompanying drawings in which:

Fig. 1 is a partially sectioned elevation view of a hand chuck assembly embodying the invention and showing the operative relation of the chuck parts;

Fig. 2 is a sectional view in elevation showing the improved chuck sleeve;

Fig. 3 is an elevational view showing the improved chuck barrel or body;

Fig. 4 is a side view of the improved ball and retainer assembly which provides operative engagement between the chuck body and sleeve;

Fig. 5 is an enlarged sectional detail as taken on line 5—5 of Fig. 1, showing the form and relation of the body and sleeve raceways with respect to the inter-acting balls;

Fig. 6 is an enlarged top plan view of the improved collet assembly of the chuck shown in Fig. 1, the view being as taken on line 6—6 of Fig. 1;

Fig. 7 is a sectional view of the same as taken on line 7—7 of Fig. 6;

Fig. 8 is a similar view as taken on line 8—8 of Fig. 6.

Fig. 9 is a top plan view, partly broken away, showing a modified form of collet assembly for the improved hand chuck of Fig. 1;

Fig. 10 is a sectional view of the same, as taken on line 10—10 of Fig. 9, and showing a portion of the collet backing plate in section;

Fig. 11 is a view similar to Fig. 9 showing a modification of the resilient jaw retainer body; and Fig. 12 is a bottom side plan view of the collet backing plate employed in the chuck assembly of Fig. 1.

In the form shown in the drawings, the improved hand chuck comprises a solid cylindrical body 1; a generally cylindrical sleeve 2 telescopingly mounted on the body 1 and having a tapered end portion 3 extending axially beyond the end of the body; a disc-like backing plate 4 housed within the sleeve 2 and bearing endwise on the body 1; and a generally conical collet assembly 5, disposed within the tapered portion 3 of the sleeve and bearing between the backing plate 4 and the tapered inner surface 6 of the sleeve, whereby axial movement of the sleeve on the body will compress or expand the collet radially to cause the same to grip or release the shank of a tool inserted into the collet through the tip end opening 7 of the sleeve.

The several members above named are the usual elements comprising any more or less conventional hand chuck of present day usage. The present invention, however, resides in the form, arrangement, and construction of the means for effecting running self-aligning and self-locking engagement of the sleeve 2 with the body 1, and in the improved form and construction of the collet 5 which, in its coaction with the sleeve 2, provides a resilient finger-tight grip on the tool shank during initial set-up, a positive self-centered clamping action on the shank when the sleeve is finally set, and a constant tensioning force on the sleeve which maintains the self-locking action of the sleeve on the chuck body.

As shown in Fig. 1, the sleeve 2 is held in running engagement with the body 1 by means of a series of balls 8 disposed between the sleeve and body in parallel helical or spiral raceways 9 and 10 formed, respectively, on the inner surface of the cylindrical portion of the sleeve 2 and on the adjacent surface of the body 1, the raceways being in the nature of the helical channels or grooves between ribs or threads 11 and 12 of uniform and equal pitch. The thread 11 on the sleeve 2, however, is of different form than the thread 12 on the body and hence the grooves or raceways 9 and 10 are of different form, as will be later described. Also, the thread 11 coacts with the thread 12 only through the medium of the balls 8, which ride in the grooves 9 and 10; and the thread and groove of the sleeve 2 are in transverse or radial alignment with those of the body 1, rather than in alternate relation as in the case of ordinary threaded engagement of male and female parts.

As shown, the balls 8 are held in equal angularly spaced relation with each other by means of a spiral retainer 12 made of flat stock, punched to provide a series of circular holes 14, one for each ball, and then rolled to spiral form with the centerline of the series of holes having the same lead as the spiral grooves or raceways 9 and 10. Preferably the retainer 13 is made with a length to provide only a single turn so that its ends abut, as shown in Fig. 4, and its diameter is such that it will ride freely over the crests of the ribs or threads 12 on the body 1. Therefore it will be understood that the radial clearance between the sleeve 2 and the body 1 will at least be sufficient to allow free passage of the retainer between them.

As shown in Fig. 3, the spiral groove or raceway 10, on the body 1, is formed adjacent the lower or inner end of the body and runs right-handedly for slightly more than three complete turns and stop pins 15 and 16 are driven into radial holes bored into the body adjacent the upper and lower ends of the groove. These stop pins are seated so as to be flush with, or slightly below, the peripheral surface of the body and serve as limit stops for the possible travel of the ball and retainer unit along the length of the groove. The opposite end of the body is provided with an internally threaded axial bore 17, concentric with the cylindrical surface of the body, for mounting the body 1 on the driven shaft or spindle of a power tool or drill press, and diametrically opposite flats 18 are formed on the body at its outer end to receive a wrench or similar tool by which the body may be tightened or loosened on the shaft or spindle to which it is applied.

As shown, the groove or raceway 10 is V-shaped, with flat sides having an included angle of 90°, and is formed with a uniform pitch like a screw thread, the pitch diameter of the rib 12 being slightly greater than the outside diameter of the body 1, so that the crest of the rib or thread will be flat, as shown in Fig. 3. Preferably the crest of the rib 12 is reduced so as to have a flat surface diameter slightly less than the outside diameter of the body 1 and the bottom of the groove is also flat.

The sleeve 2, as shown in Fig. 2, is a mainly cylindrical shell for that portion of its length which receives the body 1, and the lower or collet receiving end 3 is in the form of a hollow truncated cone terminating in the central tip-end opening 7. The inside surface 6 of the conical portion 3 is smooth and likewise conical to provide a wedge-like cam or bearing surface for the collet 5; and the axial length of the conical portion is made so that when the collet is fully expanded radially, and at the base of the internal conical space, the central opening between the teeth or crests of the collet jaws will be substantially equal of the diameter of the tip opening 7.

The opposite end of the sleeve is internally threaded to provide the spiral groove or raceway 9, which is formed on the same pitch as the body groove 10 and extends for about three and one-half turns in the right-hand direction; and the outer extremity of the sleeve is counterbored and internally threaded, as at 19, with a fine pitch to receive a lock collar 20, which has an inside diameter just sufficient for running clearance with the body 1. The lock collar 20 thus functions as a limit stop for downward travel of the sleeve, axially of the body 1, on the running interlock provided by the balls 8.

As shown in Figs. 2 and 5 the raceway or groove 9, in the sleeve 2, also has flat diverging sides but with an included angle that is greater than that between the sides of the body groove 10. Thus the groove 9 is more shallow than the opposite groove 10 in the body 1 and the sides of the groove 9 contact each of the interlocking balls 8 at points of tangency that are within the angle between the radial projections of the ball diameters extending through the points of tangency between the ball and the sides of the body groove 10.

This relationship provides the automatic or self-aligning and self-clamping feature of the improved hand chuck operating sleeve and is shown in detail in Fig. 5.

As shown in Fig. 5, the sides of the groove 10 are each inclined 45° from a centerline normal to the axis of the body 1 so that the points of tangency "a" and "b" on a ball 8, seated squarely in the groove 10, are 90° apart angularly with respect to the center of the ball. Also, the groove 10 is formed concentrically with the axis of the body 1, and hence when all of the balls 8 are seated firmly in the groove, their centers are equidistant from the body axis and collectively they form a running rib that is absolutely true. The balls 8 are not preloaded, however, when the sleeve 2 is mounted and because of normal manufacturing tolerances there is some play or looseness of the sleeve relative to the body which can cause the sleeve to become non-centric with respect to the body and result in non-centric operation of the collet jaws which clamp the tool in the chuck. The dangers inherent in such a situation are quite obvious.

In the present invention this difficulty is cured by the form of the groove or raceway 9 in the sleeve 2, and as shown in Fig. 5, this groove is formed with its sides inclined at an angle greater than 45° from a centerline normal to the sleeve axis, so that the included angle is greater than 90°. With this arrangement, the upper or pressure side of the groove 9 will contact the ball 8 at a point, such as the point "c," that is within the quadrant diametrically opposite the quadrant defined by the points of tangency "a" and "b" of the sides of the body groove 10 on the ball 8; and the line of force, indicated by the arrow "d," toward the center of the ball will be such as to not only seat the ball squarely in the body groove 10 but also wedge the sleeve onto the ball, in a self-locking and self-centering relation. This action occurs because the reactive force from the ball, against the upper side of the sleeve groove 9, is on the positive or lifting side of the line "b"—"c," through the center of the ball from the opposite pressure point "b," and tends to cam the sleeve upwardly in the collet contracting direction. Thus when a tool is clamped in the collet the sleeve can not spin or work loose upon rotation or vibration of the driving spindle. When manually released, however, the sleeve will run freely on the single turn spiral rib formed by the ball and retainer assembly.

The improved collet employed in chuck assembly of Fig. 1 is shown in detail in Figs. 6, 7 and 8, and comprises a collar 21, molded from a suitable resilient or elastically compressible material, such as rubber, and having a plurality of equi-angularly spaced openings 22 in its side wall formed to receive and retain the clamping jaw members 23, which are narrow, flat-sided, removable, metal inserts disposed radially with respect to the collar axis and with their inner longitudinal gripping edges extending parallel therewith. As shown in Fig. 6, the collar 21 is a hollow or tubular member having substantially flat sides and of equi-lateral triangular shape, in plan or transverse section. The outer corners of the collar are truncated, as at 24, square with a bisecting line from the collar axis, to form corner flats having a width substantially the same as the thickness of the jaw inserts 23, and the openings 22 are formed in these corners intermediate the ends of the collar. The axial length of the collar is substantially two-thirds the overall length of the assembled collet.

Each of the jaw members 23 is flat-sided and substantially in the form of a right triangle, in side elevation, having a long side and a short side in the same angular relation as the base and the altitude of the conical portion of the sleeve 2. The acute angle at the base of each member 23 is preferably cut off, as at 25, normal to the base or short side and the overall length of the member from base to tip is preferably such that when the collet is fully expanded into the sleeve of the chuck the opening between the inner of clamping or gripping edges 26 of the jaw members will be substantially the same as the end opening 7 at the tip of the sleeve. Also the outer or back surfaces of the jaw members are rounded to conform to the curvature of the inner surfaces of the sleeve, as indicated at 27 in Fig. 6.

As shown in Figs. 7 and 8, the side opening 22 in the collar 21 are in the nature of slots located about midway between the ends of the collar and opening to both the inside and outside collar surfaces, the ends of the slots 22 being defined by the solid portions 28 and 29 of the collar body, which bridge the corners and connect the sides of the body to form an integral and circumferentially continuous body unit. The bridging portions 28 and 29 serve also as lugs or lock bars on which the jaw members 23 are keyed to secure them in the collet assembly, as shown in Fig. 6, and for this purpose each jaw member is provided with a rectangular, transversely-extending notch 30 in its base end, adapted to straddle and snugly receive the bridge portion 28 of the collar, and a second rectangular notch 31 in its sloping back edge adapted to fit over the bridge portion 29. Preferably the notches 30 and 31 are normal to the jaw edges to which they open so that when the jaw members are mounted in the collar they will be securely interlocked therewith.

Also, as shown in Figs. 7 and 8, the lock bar or bridge portion 29 of the collar 21 is formed with a somewhat rounded outside surface 32 which projects radially as a bead, beyond the sloping back edge surface of each jaw member. Thus when the collet assembly is mounted in the chuck sleeve 2, as shown in Fig. 1, the projecting portions or beads 32 of the collar 21 will engage the conical camming or wedging surface of the sleeve and normally hold the jaw members spaced therefrom.

As shown in Figs. 6, 7, and 8 the outermost base end leg of each jaw member 23 is provided with a narrow rib 25.1 which projects endwise from the jaw member and extends parallel with the base end surface. This rib 25.1 is shaped to seat in an appropriate radial groove 25.2 formed in the collet engaging surface of the backing plate 4 and functions as a radially slidable keyway to prevent rotation of the jaws about their own axis, cocking, sidewise tilting or angular shifting of the jaw members under the resistance or counter-turning force of the tool held thereby when the tool is under load. The grooved formation of the bottom or collet engaging side of the backing plate 4 is shown in Fig. 12, and as shown a groove 25.2 is provided for each jaw member and the several grooves are angularly spaced to conform to the angular relation of the jaw members in the collet assembly.

The individual jaw members 23 are installed in the elastic collar 21, from the inside thereof, by first inserting the outermost leg of the base portion of the jaw into the sidewall aperture 22 of the collar and engaging the cross bar portion 28 of the collar in the base notch 30. The jaw member is then swung to bring its clamping edge 26 parallel with the collar axis to force its central portion into the aperture, while stretching the collar axially, and to engage and seat the collar cross bar 29 in the notch 31. This firmly hooks the jaw member into the collar body so that it can not be disengaged or removed without first stretching or distorting the collar in the axial direction by the application of manual force and operatively the jaw member and collar become as a single unit.

When all of the jaw members 23 have been assembled into the collar the collet unit is complete and this unit is inserted endwise into the chuck sleeve 2, from its wide end. The backing plate 4 is then placed in the sleeve, on top of the wide end of the collet, with the grooves 25.2 fitted onto the jaw member keys or ribs 25.1, and the sleeve assembly is mounted on the chuck barrel or body 1 by threaded engagement with the ball assembly 8—13 which has previously been mounted on the chuck body. The sleeve 2 is then locked to the body 1 by means of the lock collar 20, which screwed tightly into the threaded counterbore 19 at the wide end of the sleeve, and the chuck assembly is complete.

In the operation of the chuck the sleeve 2 is free running on the interacting ring of balls 8 and may be rapidly spun in either direction by a simple manual twisting motion. Thus the sleeve is easily and quickly run to its lowermost limit at which point the collet 5 is fully expanded by the inherent elasticity of the material from which the collet body or collar is made. In this state the jaws are fully opened to receive the tool or drill shank and once the latter has been inserted the sleeve is spun in the opposite direction to close the jaws. This closing action occurs as the sleeve is run upwardly on the chuck body thereby radially compressing the collet as it is held against the tapered end of the sleeve by the backing plate 4.

Initially, the engagement of the collet with the tapered inner surface of the sleeve is solely by way of the projecting rib or bead 32, of the collet collar, which extends beyond the tapered edge of the clamping members 23, and the function of the bead 32 is to provide a resiliently yieldable engagement between the sleeve and collet so that the tool shank will be firmly gripped by the jaw members and held in the chuck with but finger-tip turning of the sleeve on the chuck body. Thus the initial clamping of the tool is had very quickly, and with little effort, and the operator can then let go of the tool without fear of its dropping out of the chuck and becoming damaged. The sleeve is then gripped by the full hand and given a sharp right-hand twist to tightly clamp the jaws 23 on the tool shank.

This last, or final clamping action of the sleeve performs two important functions in the operation of the improved chuck. The first is to compress the elastic rib 32 into and laterally of the channel or notch 31 so that the inner wall of the sleeve physically engages the tapered edge of each jaw member 23 and positively locks the jaw members in fast clamping engagement with the tool shank. This secures the tool against shaking loose or twisting in the chuck when working. The second action is to apply axially downward force on the sleeve 2 so as to cause the pressure side of the sleeve raceway or thread groove 9 to ride into self-locking engagement with the balls 8 as previously explained, so that the sleeve becomes frictionally bound to the body 1 and can not shake or work loose and can only be released through the application of intentional manual turning force. In this last respect the compressed resilient bead 32 serves to enhance or increase the binding action of the raceway sidewall of the sleeve on the balls 8 by maintaining a constant, axially downward, resilient pressure on the sleeve.

In the modified forms of the collet shown in Figs. 9, 10 and 11, the elastic collar 33 is of annular form, slotted axially from end to end to receive the metal jaw members 34, the sections formed by the axial slots 35 being connected together only by a continuous band or ring 36 left to extend around the inner margin of the base end of the collar. In these forms the jaw member inserts 34 are set radially into the collar slots 35, from the outer side of the collar, and each is arranged to hang from the ring 36 by means of an overhanging lip or tongue 37 which projects radially inward from the base end of the insert to seat in a notch 38, formed in the outer margin of the ring 36 in axial alignment with the respective slot 35, as shown in Fig. 10. Also, as shown, the jaw members or inserts 34 are made to extend axially beyond the base end of the elastic collar 33 to provide a radial end rib 37.1, which will seat in the radial groove 25.2 formed in the backing plate 4, and each insert is provided with a pair of wing-like flanges 39 which project from opposite sides of the outer edge of the insert, adjacent its base end. These flanges 39 terminate below the rib 37.1, so as to abut endwise against the face of the backing plate 4, and they seat radially in an axially extending channel 40 formed in the outer periphery of the collar, in radial alignment with the respective slot 35, for radial engagement of the collar with the insert to urge the insert outwardly to the opened position of the fully expanded collet.

Also, the inserts 34 are formed so that the outer or tapered edge sets into the collar body, below the outer surface thereof, which is of conical shape to conform to the interior wall surface of the clutch sleeve 2. Thus the elastic collar body, rather than the outer edges of the inserts, will normally engage the wall of the sleeve 2, when assembled therewith, and the sleeve will engage the inserts only when in final clamping position.

The form of collet shown in Fig. 11 differs from that of Fig. 10 only in that the collar 36 is made in a plurality of angularly successive individual sections which are joined edge to edge, by means of an axially extending slidably engaging, dove-tail joint 41, to form the complete annular body.

The main advantages of this invention reside in the improved construction of the chuck wherein the coaction of the ball bearing supported sleeve and the elastic collet provides a free running relation between the sleeve and the barrel and at the same time effects a self-locking and self-aligning set of the chuck parts whenever a tool shank is clamped in the collet; in the improved construction of sleeve and barrel running means whereby rapid and positive clamping action is obtained with a minimum of manual effort; and in the improved collet construction which provides a secure resilient grip on the tool shank during initial set-up of the tool and with only finger-tip force from the operator's hand.

Further advantages are to be found in the fact that a positive and secure clamping of the tool shank is obtained without the use of tightening tools or wrenches; in the overall simplicity of the form and construction of the chuck parts, and in the fact that the improved chuck can be manufactured by mass production methods and at a greatly reduced cost.

Although one specific embodiment of the improved hand chuck construction is herein shown and described, and although several forms of the improved collet member are disclosed, it will be understood that numerous details of the construction shown may be altered or omitted without departing from the spirit of this invention as defined by the following claims.

I claim:

1. A chuck comprising a cylindrical body having a spiral groove and a series of balls extending spirally in said groove about its periphery and projecting radially therefrom, a sleeve having an open ended hollow cylindrical portion and a spiral groove on the inner surface thereof for receiving said body axially in screw-threaded engagement with said series of balls, said groove having a flat, uniformly inclined wall on the side adjacent the open end of said sleeve for running engagement with the balls on said body, a hollow internally conical portion on said sleeve extending axially beyond the cylindrical portion thereof and converging to a concentric tip opening, a radially contractible and expansible collet disposed within the conical portion of said sleeve in angularly and axially sliding engagement with the surface thereof, said collet having radially shiftable tool clamping jaws and an elastic body with said jaws mounted therein, and said elastic body being in constant radial engagement with the conical surface of said sleeve.

2. A chuck comprising a cylindrical body having a spiral groove and a series of balls extending spirally in said groove about its periphery and projecting radially therefrom, a sleeve having an open ended hollow cylindrical portion and a spiral groove on the inner surface thereof for receiving said body axially in screw-threaded engagement with said series of balls, said groove having a flat informally inclined wall on the side adjacent the open end of said sleeve for running engagement with the balls on said body, a hollow internally conical portion on said sleeve extending axially beyond the cylindrical portion thereof and converging to a concentric tip opening, a radially contractible and expansible collet disposed within the conical portion of said sleeve in angularly and axially sliding engagement with the surface thereof, said collet having radially shiftable tool clamping jaws and an elastic body with said jaws mounted therein, means for providing axial thrust between said body and said collet, and said elastic body being in constant radial engagement with the conical surface of said sleeve.

3. A chuck comprising a cylindrical body having a spiral groove and a series of balls extending spirally in said groove about its periphery and projecting radially therefrom, a sleeve having an open ended hollow cylindrical portion and a spiral groove on the inner surface thereof for receiving said body axially in screw-threaded engagement with said series of balls, said groove having flat converging side walls for tangential engagement with said balls, a hollow internally conical portion on said sleeve extending axially beyond the cylindrical portion thereof and converging to a concentric tip opening, a radially contractible and expansible collet disposed within the conical portion of said sleeve in angularly and axially sliding engagement with the surface thereof, said collet having radially shiftable tool clamping jaws and an elastic body with said jaws mounted therein, and said elastic body being in constant radial engagement with the conical surface of said sleeve.

4. A chuck comprising a cylindrical body having a spiral groove and a series of balls extending in said groove spirally about its periphery and projecting radially therefrom, a sleeve having an open ended hollow cylindrical portion and a spiral groove on the inner surface thereof for receiving said body axially in screw-threaded engagement with said series of balls, said groove having flat side walls converging equi-angularly toward the bottom thereof for tangential engagement with said balls, a hollow internally conical portion on said sleeve extending axially beyond the cylindrical portion thereof and converging to a concentric tip opening, a radially contractible and expansible collet disposed within the conical portion of said sleeve in angularly and axially sliding engagement with the surface thereof, said collet having radially shiftable tool clamping jaws and an elastic body with said jaws mounted therein, means for providing axial thrust between said body and said collet, and said elastic body being in constant radial engagement with the conical surface of said sleeve.

5. A chuck comprising a cylindrical body having a spiral peripheral groove adjacent one end, a series of balls seated in said groove and of uniform diameter greater than the effective depth of said groove, said balls extending circumferentially around said body, a sleeve having a cylindrical passage open at one end for receiving said body axially, and said passage having a spiral groove in its side wall for screw-threaded engagement with said series of balls, said last named groove having a flat uniformly inclined side wall on the side adjacent said one end, an internally conical portion at the other end of said sleeve converging axially to a concentric tip opening, a radially contractible and expansible collet in the conical portion of said sleeve in angularly and axially slidable engagement with the surface thereof, said collet having radially shiftable tool clamping jaws and an elastic collar with said jaws mounted therein, and said elastic collar being in constant resilient radial engagement with the wall of said conical portion.

6. A chuck comprising a cylindrical body having a spiral peripheral groove adjacent one end, said groove having flat sides, a series of balls seated in said groove and of uniform diameter greater than the effective depth of said groove, said balls extending circumferentially around said body and each having tangential engagement with the flat sides of said groove, a sleeve having a cylindrical passage open at one end for receiving said body axially and said passage having a spiral groove in its side wall for screw-threaded engagement with said series of balls, said last named groove having a flat uniformly inclined side wall on the side adjacent said one end, an internally conical portion at the other end of said sleeve converging axially to a concentric tip opening, a radially contractible and expansible collet in the conical portion of said sleeve in angularly and axially slidable engagement with the surface thereof, said collet having radially shiftable tool clamping jaws and an elastic collar with said jaws mounted therein, and said elastic collar being in constant resilient radial engagement with the wall of said conical portion.

7. A chuck comprising a cylindrical body having a spiral peripheral groove adjacent one end, said groove having flat sides, a series of balls seated in said groove and of uniform diameter greater than the effective depth of said groove, said balls extending circumferentially around said body and each having tangential engagement with the flat sides of said groove, a sleeve having a cylindrical passage open at one end for receiving said body axially and said passage having a spiral groove in its side wall for screw-threaded engagement with said series of balls, said last-named groove having a flat uniformly inclined side wall on the side adjacent said one end and normally engaging each of said balls tangentially at a point between diameters intersecting the points of tangency with the sides of the first named groove, an internally conical portion at the other end of said sleeve converging axially to a concentric tip opening, a radially contractible and expansible collet in the conical portion of said sleeve in angularly and axially slidable engagement with the surface thereof, said collet having radially shiftable tool clamping jaws and an elastic collar with said jaws mounted therein, and said elastic collar being in constant resilient radial engagement with the wall of said conical portion.

8. A chuck comprising a cylindrical body having a spiral peripheral groove adjacent one end, said groove having flat sides converging equi-angularly toward the bottom thereof, a series of balls seated in said groove and of uniform diameter greater than the effective depth of said groove, said balls extending circumferentially around said body, a sleeve having a cylindrical passage open at one end for receiving said body axially and said passage having a spiral groove in its side wall for screw-threaded engagement with said series of balls, said last named groove having a flat uniformly inclined side wall on the side adjacent said one end, and normally engaging each of said balls tangentially at a point between diameters intersecting the points of tangency of said balls with the sides of the first named groove, an internally conical portion at the other end of said sleeve converging axially to a concentric tip opening, a radially contractible and expansible collet in the conical portion of said sleeve in angularly and axially slidable engagement with the surface thereof, said collet having radially shiftable tool clamping jaws and an elastic collar with said jaws mounted therein, and said elastic collar being in constant resilient radial engagement with the wall of said conical portion.

9. A chuck comprising a cylindrical barrel having a spiral groove adjacent one end, said groove having flat sides converging equi-angularly toward the bottom thereof and progressing with a uniform pitch through a plurality of turns, a series of balls seated in said groove and spaced uniformly along one turn thereof said balls having a uniform diameter and tangentially engaging the flat sides of said groove, a sleeve having a cylindrical passage opening to one end for receiving said barrel axially and a spiral groove in the wall of said passage for screw-threaded engagement with said series of balls, the last named groove having flat equi-angularly converging sides and the included angle between said sides being greater than that between the sides of the first named groove, a hollow wedging portion at the other end of said sleeve having a smooth conical wall surface, a plurality of radially movable jaws within said wedging portion operable to open and close upon axial movement of said sleeve relative to said barrel, and an elastic collar having said jaws mounted therein and bearing radially against said conical wall surface.

10. A chuck comprising a cylindrical barrel having a spiral groove adjacent one end, said groove having flat sides converging equi-angularly toward the bottom thereof and progressing with a uniform pitch through a plurality of turns, a series of balls seated in said groove and spaced uniformly along one turn thereof, said balls having a uniform diameter, and tangentially engaging the flat sides of said groove, annular retainer means for holding said balls in uniformly spaced relation, a sleeve having a cylindrical passage opening to one end for receiving said barrel axially and a spiral groove in the wall of said passage for screw-threaded engagement with said series of balls, the last named groove having flat equi-angularly converging sides and the included angle between said sides being greater than that between the sides of the first named groove, a hollow wedging portion at the other end of said sleeve having a smooth conical wall surface, a plurality of radially movable jaws within said wedging portion operable to open and close upon axial movement of said sleeve relative to said barrel, means for supporting said jaws against axial thrust from said wedging portion upon closing said jaws, and an elastic collar having said jaws mounted therein and bearing radially against said conical wall surface.

11. A chuck comprising a cylindrical barrel having a series of angularly spaced balls extending along one turn of a spiral path on its periphery, a hollow sleeve having a cylindrical portion for receiving said barrel axially and having a flat sided spiral groove in its inner wall for running screw-threaded engagement with said series of balls, a plurality of tool clamping jaws disposed endwise with respect to said barrel, and a wedge-surface portion on said sleeve operable upon axial shifting of said sleeve on said barrel to engage said jaws and shift them radially into clamping engagement with a tool inserted axially between them, the side of said groove in compression engagement with said balls during jaw-wedging screw-threaded operation of said sleeve being inclined at a uniform angle in the plane of the sleeve axis.

12. A chuck comprising a cylindrical barrel having a series of angularly spaced balls extending along one turn of a spiral path on its periphery, said path being a groove having flat equi-angular converging sides tangentially engaging said balls, a hollow sleeve having a cylindrical portion for receiving said barrel axially and having a flat sided spiral groove in its inner wall for running screw-threaded engagement with said series of balls, a plurality of tool clamping jaws disposed endwise with respect to said barrel, and a wedge-surface portion on said sleeve operable upon axial shifting of said sleeve on said barrel to engage said jaws and shift them radially into clamping engagement with a tool inserted axially between them, the last named groove having flat equi-angular converging sides with a greater included angle than that between the sides of the first named groove.

13. A chuck comprising a cylindrical barrel having a series of angularly spaced balls extending along one turn of a spiral path on its periphery, said path being a groove having flat equi-angular converging sides tangentially engaging said balls, a hollow sleeve having a cylindrical portion for receiving said barrel axially and having a flat sided spiral groove in its inner wall for running screw-threaded engagement with said series of balls, a plurality of tool clamping jaws disposed endwise with respect to said barrel, and a wedge-surface portion on said sleeve operable upon axial shifting of said sleeve on said barrel to engage said jaws and shift them radially into clamping engagement with a tool inserted axially between them, the last named groove having flat equi-angular converging sides with a greater included angle than that between the sides of the first named groove.

14. A chuck collet comprising a tubular body of elastic material having a plurality of angularly spaced radial openings in its sidewall, a flat sided jaw member inserted radially in each of said openings in tight engagement with said tubular body and having an axially parallel inner edge projecting radially inward from the inside surface of said body, the inner edges of said jaw members extending axially beyond one end of said body and the outer edges of said jaw members converging toward the extending ends of the inner edges, and portions of said body projecting radially outward beyond the outer converging edges of said jaw members.

15. A chuck collet comprising a tubular body of elastic material having a plurality of angularly spaced openings in its side wall, a flat triangularly shaped jaw member mounted in each of said openings in tight engagement with said tubular body to lie in a plane substantially radial with respect to the body axis, each jaw member having a short base edge and a long inside edge normal to each other, and a tapering outside edge extending therebetween, the long side edges of said members projecting radially inward from the inside wall of said body and being of greater axial length than said body, means on said jaw members having radially inward engagement with said body, and portions of said body projecting radially outward beyond the tapering outside edges of said jaw members.

16. A chuck collet comprising an elastic tubular collar of triangular cross-section with truncated corners and having a radial opening in each corner intermediate the collar ends, and a flat metal jaw member inserted radially into each opening in tight engagement with said tubular body and disposed in a plane parallel with the collar axis, each jaw member being of substantially right triangular shape with a short base edge and a long side edge normal thereto, the base edge of said member being notched between its ends to axially straddle the one end of said collar at the adjacent end of the respective opening, the long side edge of said member projecting radially inward from the inner wall of said collar and extending axially beyond the other end of said collar, and the tapered edge of said member having a notch to receive the margin of said collar at the other end of said opening, the last named collar margin projecting radially outward beyond said tapered edge of each jaw member.

17. A chuck collet comprising an elastic tubular collar of triangular cross-section with truncated corners and having a radial opening in each corner intermediate the collar ends, and a flat metal jaw member inserted radially into each opening in tight engagement with said tubular body and disposed in a plane parallel with the collar axis, each jaw member being of substantially right triangular shape with a short base edge and a long side edge normal thereto, the base edge of said member being notched between its ends to axially straddle the one end of said collar at the adjacent end of the respective opening, the long side edge of said member projecting radially inward from the inner wall of said collar and extending axially beyond the other end of said collar, and the tapered edge of said member having a notch to receive the margin of said collar at the other end of said opening, the last named collar margin projecting radially outward beyond said tapered edge of each jaw member, and a radial rib on the base end of each jaw member projecting axially beyond the adjacent end of said collar.

18. A chuck collet comprising an annular collar of elastic material having a conically tapered outer wall surface, said collar having a plurality of angularly spaced radial slots extending from end to end except for an inside marginal rim at the wide base end, and a plurality of flat triangularly shaped jaw members disposed one in each slot in tight engagement with said collar to lie in radial planes intersecting at the collar axis, each jaw member having a long edge projecting radially inward from the inside wall of the collar and extending axially from the base end thereof to a point beyond the other end of the collar, the base end of each jaw member having a radial tongue portion overhanging the said marginal rim of the collar and a lateral flange projecting from each side of its outer edge to engage the outer wall of said collar, said collar having channels formed in its outer wall to receive said flanges flush with the surface thereof, and the tapered edge of each jaw member extending parallel with and below the conical outer surface of said collar.

19. A chuck collet comprising a plurality of flat metal jaw members disposed in respective angularly spaced planes intersecting at a common axis and each having an inner gripping edge extending parallel with said axis, said jaw members each having an outer edge tapering outwardly from a tip end to a base end, the base ends of said members lying in a common plane normal to said axis, and a tubular elastic collar laterally connecting said jaw members in tight engagement therewith and adapted to hold them in angularly spaced relation, said jaw members having transverse notches through which integral connecting portions of said collar extend, and said collar having outer wall portions which project radially outward beyond the outer tapered edges of said jaw members.

References Cited in the file of this patent
UNITED STATES PATENTS

| | | |
|---|---|---|
| 1,425,213 | Palmgren | Aug. 8, 1922 |
| 1,488,001 | Clare | Mar. 25, 1924 |
| 2,406,444 | Stoner | Aug. 27, 1946 |
| 2,413,421 | Stoner | Dec. 31, 1946 |
| 2,459,899 | Stoner | Jan. 25, 1949 |
| 2,535,105 | Vidal | Dec. 26, 1950 |
| 2,629,414 | Stoner et al. | Feb. 24, 1953 |
| 2,683,041 | Haviland | July 6, 1954 |